(12) United States Patent
Ichihara et al.

(10) Patent No.: US 11,111,662 B2
(45) Date of Patent: Sep. 7, 2021

(54) FLUSH TOILET (71) Applicant: LIXIL Corporation, Tokyo (JP)

(72) Inventors: Saori Ichihara, Tokyo (JP); Isato Hirasawa, Tokyo (JP); Tomoya Sasaki, Tokyo (JP); Takeya Ichiyanagi, Tokyo (JP); Sou Okuizumi, Tokyo (JP); Makoto Saruta, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 15/998,945

(22) PCT Filed: Feb. 16, 2017

(86) PCT No.: PCT/JP2017/005680
§ 371 (c)(1),
(2) Date: Aug. 17, 2018

(87) PCT Pub. No.: WO2017/142010
PCT Pub. Date: Aug. 24, 2017

(65) Prior Publication Data
US 2019/0153712 A1  May 23, 2019

(30) Foreign Application Priority Data

Feb. 19, 2016 (JP) .............................. JP2016-029956

(51) Int. Cl.
*E03D 11/02* (2006.01)
*E03D 11/00* (2006.01)
*E03D 5/10* (2006.01)
*G01F 23/56* (2006.01)

(52) U.S. Cl.
CPC .............. *E03D 11/02* (2013.01); *E03D 5/105* (2013.01); *E03D 11/00* (2013.01); *G01F 23/56* (2013.01)

(58) Field of Classification Search
CPC ......... E03D 11/00; E03D 11/13; E03D 5/026; E03D 9/08
USPC ............................................................ 4/427
See application file for complete search history.

(56) References Cited

U.S. PATENT DOCUMENTS

| 1,090,200 | A | * | 3/1914 | Cole ........................ E03D 11/00 4/427 |
| 2,080,073 | A | * | 5/1937 | Finley ..................... E03D 11/00 4/370 |
| 3,987,502 | A | * | 10/1976 | Hartmann ................. E03C 1/01 4/420 |
| 4,538,307 | A | * | 9/1985 | Barnum ................... E03D 11/00 4/427 |

(Continued)

FOREIGN PATENT DOCUMENTS

| DE | 202010001417 | 7/2010 |
| JP | 1-287331 | 11/1989 |
| JP | 3-224925 | 10/1991 |

OTHER PUBLICATIONS

International Search Report dated Apr. 11, 2017, directed to International Application No. PCT/JP2017/005680; 4 pages.

Primary Examiner — Janie M Loeppke
(74) Attorney, Agent, or Firm — Morrison & Foerster LLP (57) ABSTRACT A flush toilet includes: a toilet main body; a rim which is provided on an upper portion of a toilet bowl of the toilet main body and which flows a flush water into the toilet bowl; and a water level detection sensor which is provided inside the rim.

11 Claims, 6 Drawing Sheets (56) References Cited

U.S. PATENT DOCUMENTS

| | | | | |
|---|---|---|---|---|
| 4,891,864 A | * | 1/1990 | Laverty, Jr. .............. | E03D 3/02 |
| | | | | 137/624.12 |
| 5,271,104 A | * | 12/1993 | LaTora ................... | E03D 9/08 |
| | | | | 4/420.4 |
| 6,178,569 B1 | | 1/2001 | Quintana | |
| 6,934,977 B1 | | 8/2005 | Quintana et al. | |
| 2007/0157374 A1 | | 7/2007 | Morris | |

* cited by examiner

FLUSH TOILET

REFERENCE TO RELATED APPLICATIONS

This application is a national stage application under 35 USC 371 of International Application No. PCT/JP2017/005680, filed Feb. 16, 2017, which claims the priority of Japanese Application No. 2016-029956, filed Feb. 19, 2016, the entire contents of each of which are incorporated herein by reference.

FIELD OF THE INVENTION

The present invention relates to a flush toilet in which flush water is prevented from overflowing from a toilet bowl due to clogging of a trap pipeline or the like of the toilet bowl.

BACKGROUND OF THE INVENTION

In the related art, Patent Document 1 discloses a flush toilet that has been proposed as a device in which flush water is prevented from overflowing due to filth or the like clogged in a trap pipeline or the like of a toilet bowl. In this flush toilet, a water level detection sensor is provided either at a bottom surface of a rim water supply chamber that supplies flush water to the toilet bowl or at a position that faces a bowl portion of a bottom surface of a rim portion, and the water level detection sensor faces the bowl portion.

The water level detection sensor of the above related art detects the height of the surface of seal water based on the time it takes for an emitted ultrasonic wave to be reflected by a surface of the seal water inside the bowl portion and return. In the above flush toilet, in a case where clogging of the pipeline occurred, the water overflowing from the toilet bowl is detected using the ultrasonic wave of the water level detection sensor, the water level detection result is input to a monitoring device, and the user is informed of the clogging by an indicator such as a lamp or a buzzer.

As another means, it is proposed that a pressure sensor is attached to the trap pipeline that is connected to a downstream side of the toilet bowl, which detects a change in the water pressure, and thereby detects clogging of the pipeline.

Patent Document 1 Japanese Unexamined Patent Application, First Publication No. H03-224925

SUMMARY OF THE INVENTION

However, in the flush toilet of Patent Document 1, the water level detection sensor is exposed at the bottom surface of the rim water supply chamber that faces the bowl portion or the bottom surface of the rim portion. Therefore, there have been concerns that the water level detection sensor may erroneously detect a normal change in the water level of the flush water associated with normal toilet flushing, or erroneously detect water for cleaning, the cleaner's hand, or the like during manual toilet cleaning.

The present invention was made in view of the above-described situation, and has an object to provide a flush toilet that can prevent an erroneous detection of the rise in the flush water without being affected by normal flushing or by water or person's hand during manual toilet cleaning.

A flush toilet according to a first aspect of the present invention includes a toilet main body; a rim which is provided on an upper portion of a toilet bowl of the toilet main body and along which a flush water flows into the toilet bowl; and a water level detection sensor which is provided inside the rim.

According to the above-described flush toilet, because the water level detection sensor is provided inside the rim of the toilet main body, the configuration can prevent the water level detection sensor from erroneously detecting flush water that is supplied at the time of normal toilet flushing or from erroneously detecting fluctuations of the water pressure during the normal flushing. The prevention of erroneous detections can be achieved because the human hand or the water during manual cleaning does not interfere with the water level detection sensor.

According to a second aspect of the present invention, in the flush toilet of the first aspect, the water level detection sensor may be provided on a base portion which is positioned on an upper portion of the rim and at which a functional portion is installed, or is provided at an upper portion of the rim.

According to the above-described flush toilet, by installing the water level detection sensor on the upper surface of the rim, the water level can be detected before the rising water level exceeds the upper surface of the rim, preventing the water from overflowing from the rim. Alternatively, by installing the water level detection sensor at the base portion of the upper portion of the rim, the water level can be detected before the rising water level exceeds the base portion, preventing the functional portion that is provided on the base portion from being immersed in the water. Conventionally, because the rim provided in the upper portion of the toilet main body has been made of ceramic, a significant labor and cost have been required in order to install the water level detection sensor to the rim. However, according to the above-described flush toilet, the sensor may be installed on the base portion at the upper portion of the rim, and the base portion can be formed by a non-ceramic material member such as a resin member. Therefore, the installation of the water level detection sensor is easy.

According to a third aspect of the present invention, in the flush toilet of the first aspect or the second aspect, the water level detection sensor may be installed upstream of a rim water passage of the rim through which the flush water is supplied into the toilet bowl.

According to the above-described flush toilet, by installing the water level detection sensor in the upstream side of the rim water passage, the water level detection sensor is prevented from being immersed and from being affected by fluctuations of the pressure of the flush water at the time of usual toilet flushing.

In the flush toilet according to the present invention, when the toilet bowl of toilet main body is clogged, the rise in the water level of the flush water that is supplied to the toilet bowl can be detected by the water level detection sensor inside the rim. Furthermore, this configuration can prevent the water level detection sensor from erroneously detecting the flush water or water pressure thereof at the time of normal toilet flushing. The rim prevents a cleaner's hand, water for cleaning or the like from interfering with the water level detection sensor, thereby preventing erroneous detections by the water level detection sensor. Because the water level detection sensor is provided inside the rim, it does not influence the design of the outside appearance.

DETAILED DESCRIPTION OF THE INVENTION

A flush toilet including a water level detection sensor according to an embodiment of the present invention will be described with reference to drawings.

FIGS. 1 to 5 are views of a flush toilet 1 according to the embodiment of the present invention. In the present embodiment, "rear portion" or a "rearward" is defined to be the portion or direction toward the wall of the toilet space in which the flush toilet 1 is installed, or toward the back of the toilet space. The "front portion" or the "forward" is defined to be the opposite of the above, or to be the portion or the direction facing a user urinating in a standing position.

Figure 1:
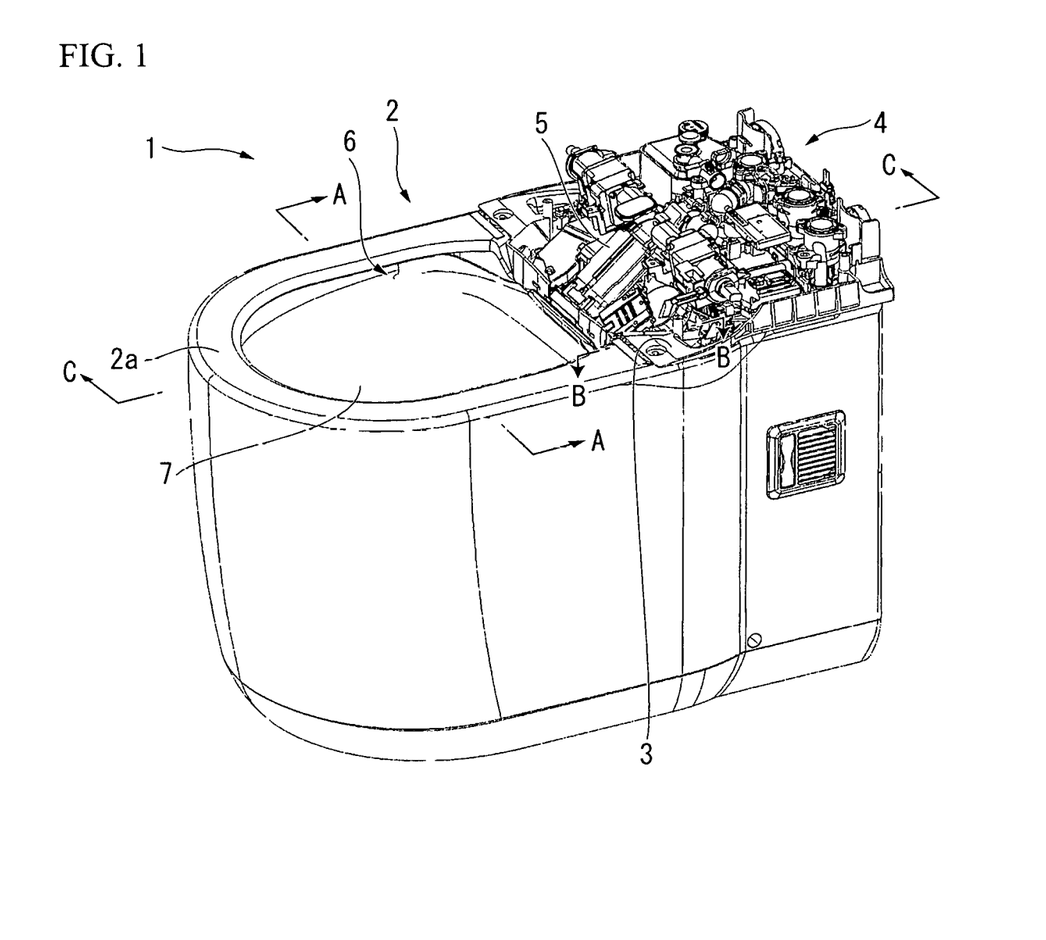
FIG. 1 is a perspective view of a main portion of a flush toilet according to an embodiment of the invention.

As shown in FIG. 1, the flush toilet 1 according to the present embodiment may be a floor-mounted-type which can be installed on, for example, the floor of a toilet space. The flush toilet 1 may also be wall-mounted-type. A toilet bowl 7 is provided in front of a toilet main body 2 made of ceramic. An upper surface 2a of the toilet main body 2 is provided on an upper peripheral part of the toilet bowl 7 and a rim 6 is provided on the backside of the upper surface 2a. A base plate 3 is installed on an upper surface of a rear portion of the toilet bowl 7. A functional portion 4 such as a private part cleaning device is installed on the base plate 3. Various functional components such as a cleaning nozzle 5, a warm water tank that is warmed by a heater, a deodorizing device, and electrical components are installed in the functional portion 4.

Figure 2:
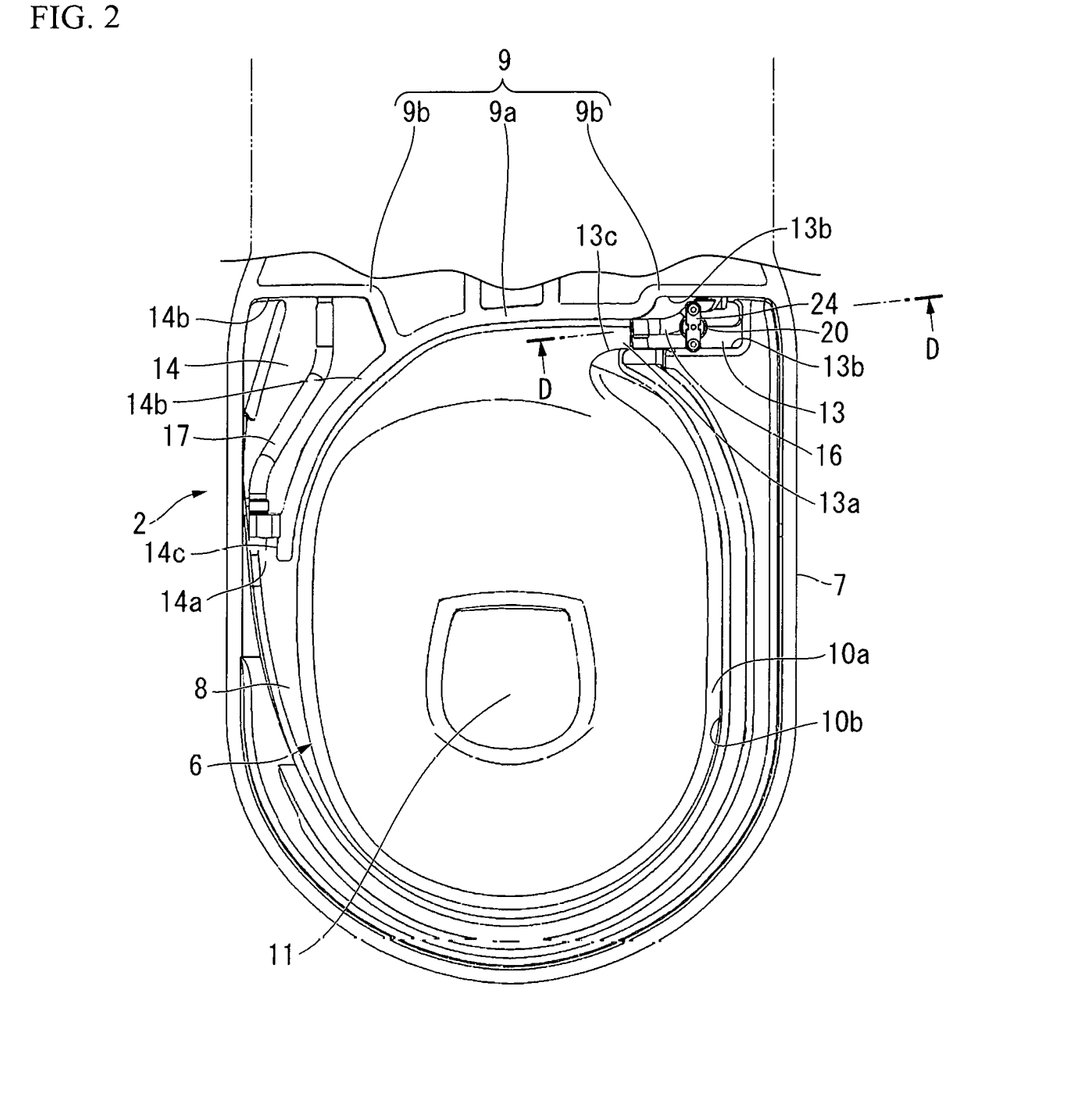
FIG. 2 is a plane view of a main portion showing an arrangement of a rim water passage in a toilet main body of the present embodiment.
Figure 3:
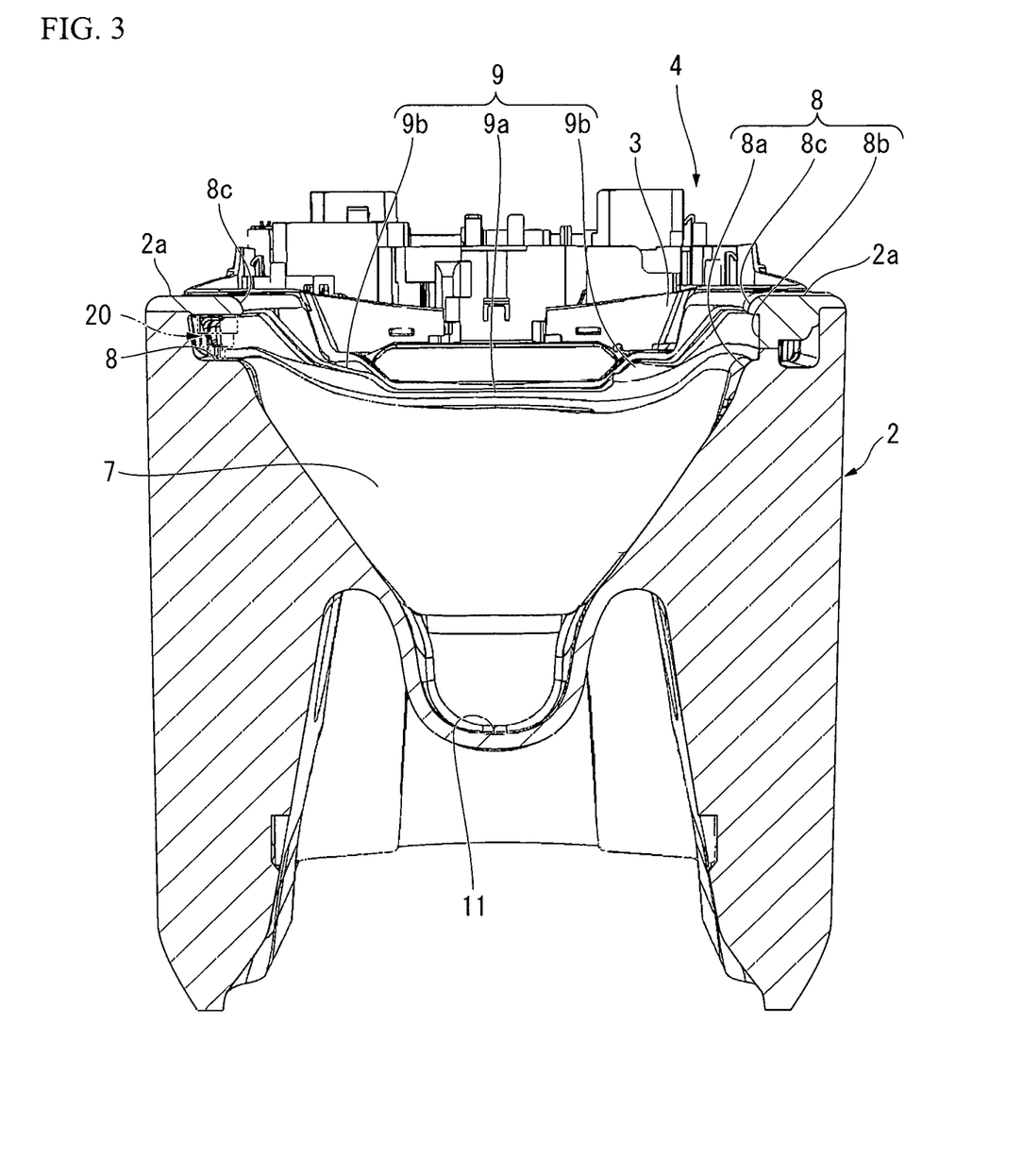
FIG. 3 is a cross-sectional view along line A-A of the toilet main body shown in FIG. 1.

FIG. 2 is a view of the toilet main body 2 without the upper surface 2a and the base plate 3. FIG. 3 is a cross-sectional view along line A-A of FIG. 1. In FIG. 2, a water pooling portion 11 is provided on an inner surface of the toilet bowl 7 that is formed in front of the toilet main body 2. The water pooling portion 11 is formed such that a center area of the inner surface of the toilet bowl 7 is inclined downward and is declined toward a bottom portion. The water pooling portion 11 is communicated with a drainage path that discharges the flush water.

As shown in FIG. 3, a concave portion 9 is formed at a rear part of the toilet bowl 7 of the toilet main body 2. The concave portion 9 is the rear part of the toilet bowl 7 to which the base plate 3 is installed and configures a part of the upper surface 2a. The concave portion 9 is formed at a position that is one step lower than the upper surface 2a of the front and the side portions surrounding the toilet bowl 7. Accordingly, the height of the functional portion 4 that is installed to the base plate 3 can be lowered. The concave portion 9 is formed with a central lower portion 9a and step portions 9b. The central lower portion 9a faces the toilet bowl 7, and a nozzle unit is installed to the central lower portion 9a. The step portions 9b are formed extending rearward surrounding the central lower portion 9a and are one step higher than the central lower portion 9a, and the base plate 3 is installed to the step portion 9b.

As shown in FIG. 2 and FIG. 3, the rim 6 is formed in the upper peripheral part of the toilet bowl 7 of the toilet main body 2. The rim 6 includes a rim water passage 8, a first rim headrace 13, and a second rim headrace 14. The flush water that cleans the toilet bowl 7 flows through the rim water passage 8. The first rim headrace 13 and the second rim headrace 14 are the spaces positioned upstream of the rim water passage 8 and is communicated with the rim water passage 8.

In the rim 6, the rim water passage 8 is bent in an approximately elliptical shape along the upper peripheral part of the toilet bowl 7. The rim water passage 8 is formed on the reverse side of the upper surface 2a. As shown in FIG. 3, the rim water passage 8 includes a shelf portion 8a, a side wall portion 8b, and an eaves portion 8c. The shelf portion 8a forms an approximately flat portion of the upper portion that is connected to an inclined portion gradually connecting to the water pooling portion 11 at the center of the toilet bowl 7. The side wall portion 8b is a wall portion that erects at the outer circumference of the shelf portion 8a. The eaves portion 8c extends from the side wall portion 8b toward the inside and projects upward. When the flush water flows through the rim water passage 8, the side wall portion 8b and the eaves portion 8c can prevent the flush water from splashing out. The upper surface 2a of the toilet bowl 7 includes the upper surface of the eaves portion 8c.

As shown in FIG. 2, in the rim 6, the first rim headrace 13 and the second rim headrace 14 are provided at the rear portion of the toilet bowl 7 to the right and left of the front bottom portion of the concave portion 9. The first rim headrace 13 and the second rim headrace 14 are areas that are respectively surrounded by side wall portions 13b and 14b positioned outside and the wall portions 13c and 14c positioned inside, and are capable of storing water. A first water outlet 13a that is communicated with the rim water passage 8 is formed in the right side at the end of the first rim headrace 13. The flush water discharged from the first water outlet 13a flows through the rim water passage 8 toward the second rim headrace 14, and thereafter, the flush water flows along a curved line counterclockwise along the circumferential direction of the toilet bowl 7.

A second water outlet 14a that is communicated with the rim water passage 8 is formed in the left side at the distal end of the second rim headrace 14. The flush water discharged from the second water outlet 14a flows through the rim water passage 8 counterclockwise along circumferential direction of the toilet bowl 7. Immediately, after the flush water is discharged from the second water outlet 14a into the rim water passage 8, the flash water joins with the flush water discharged from the first water outlet 13a.

A first spouting pipe 16 is installed in the first rim headrace 13. The first spouting pipe 16 brunches from a flush water distributor that is provided at a flush water inlet pipe (not shown in the drawing). A water outlet of the first spouting pipe 16 is installed in a vicinity of the first water outlet 13a in the first rim headrace 13. Similarly, a second spouting pipe 17 is installed in the second rim headrace 14. The second spouting pipe 17 brunches from the flash water distributor. A water outlet of the second spouting pipe 17 is installed toward the second water outlet 14a in the second rim headrace 14.

Figure 7:
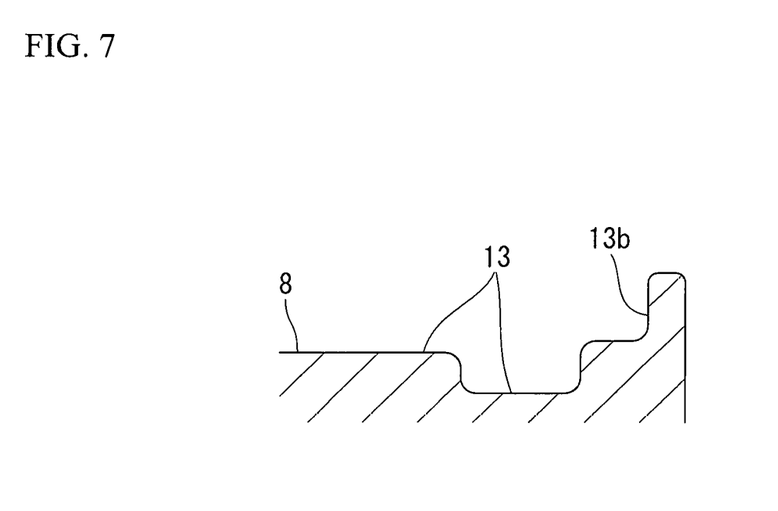
FIG. 7 is a cross-sectional view along line D-D showing the first rim headrace in FIG. 2.

The first rim headrace 13 and the second rim headrace 14 are formed in a concave shape at a position lower than the rim water passage 8 of the toilet bowl 7 (see FIG. 7). Alternatively, the first rim headrace 13 and the second rim headrace 14 may be formed without a concave shape. The base plate 3 is installed at a position higher than the first rim headrace 13 and the second rim headrace 14.

Figure 4:
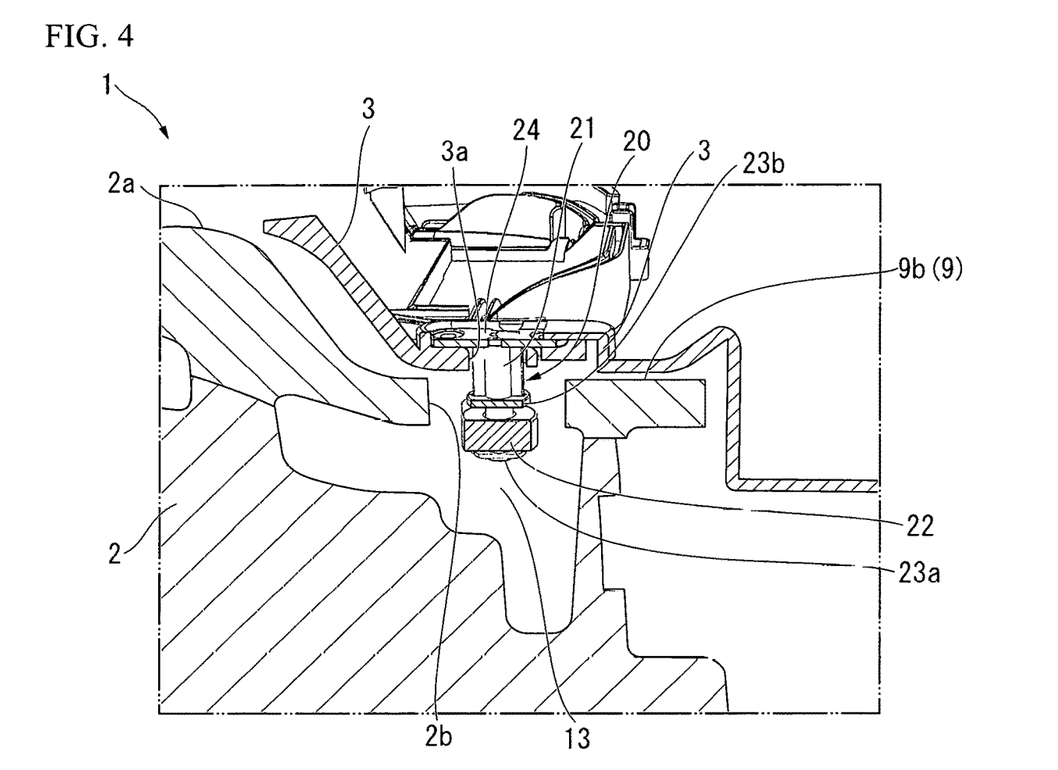
FIG. 4 is a cross-sectional view along line B-B showing the water level detection sensor that is attached inside the rim of the toilet main body shown in FIG. 1.
Figure 5:
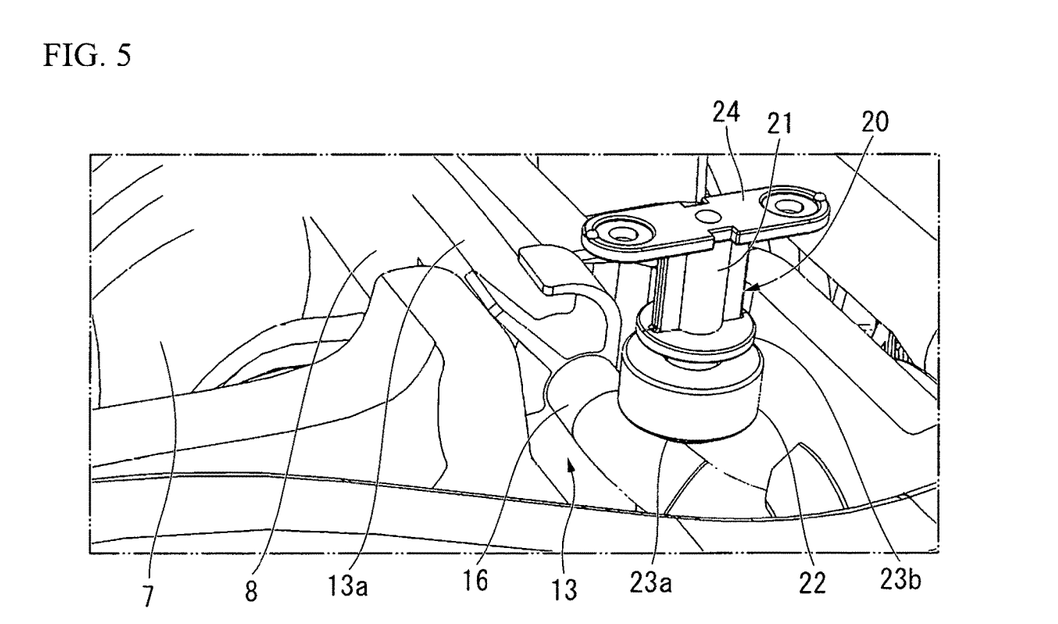
FIG. 5 is an enlarged view of a main portion showing the water level detection sensor that is arranged inside the first rim headrace of the rim.

In FIG. 2, the water level detection sensor 20 is installed on a lower surface of the base plate 3 in the first rim headrace 13 connected to the upstream side of the rim water passage 8 in the rim 6. The water level detection sensor 20 is configured such that, when the flush water supplied in the toilet bowl 7 is raised, the water level is detected before the water overflows from the toilet bowl 7, causing the supply to stop. As shown in FIG. 4 and FIG. 5, the water level detection sensor 20 is provided with a float 22 and stoppers 23a and 23b. The float 22 is, for example, attached at a lower portion of a supporting shaft 21 that extends vertically and the float 22 is capable of moving vertically. The stoppers 23a and 23b are fixed to upper and lower portions of the float 22. A fixing plate 24 for fixing the water level detection sensor 20 to the base plate 3 is provided at the upper end of the supporting shaft 21.

As the water level detection sensor 20, for example, a reed-switch-type float switch is adopted. The float switch has a magnet provided inside the float 22, detects the position of the float 22 by the magnet. The float switch is configured to turn on when the position of the float 22 rises from a lower limit position to an upper limit position due to a rise of the water level, which cases the switch to turn on. The water level detection sensor 20 is not limited to be a float switch. As described above, a sensor that detects the water level by an ultrasonic wave or light, or any appropriate sensor that detects water may be adopted. The float 22 of the water level detection sensor 20 supported by the base plate 3 is installed at a position lower than at least the step portions 9b of the concave portion 9. This configuration prevents the electrical components of the functional portion 4 installed on the base plate 3 from being immersed in the water even if the water level of the toilet bowl 7 raised.

As shown in FIG. 4, in the water level detection sensor 20 installed in the first rim headrace 13, the supporting shaft 21 penetrates a hole portion 2b formed in the step portion 9b (upper surface 2a) of the toilet main body 2 and a hole portion 3b that is formed in the base plate 3 and projects upward. The fixing plate 24 provided at the upper end of the supporting shaft 21 is fixed to the upper surface of the base plate 3 by a screw or the like.

As shown in FIG. 1 and FIG. 4, the upper surface 2a of the toilet main body 2 including the upper surface of the eaves portion 8c (see FIG. 3) covers the first rim headrace 13 and the second rim headrace 14 at the area of the step portions 9b of the concave portion 9 that is at a position recessed by one step. The upper surface 2a extends below the front end portion of the base plate 3. Because the first rim headrace 13 and the second rim headrace 14 are lower than the rim water passage 8, those spaces are capable of storing part of the flush water. When the toilet bowl 7 is clogged and the water level of the flush water raised, the flush water which flows via the rim water passage 8 is stored in each of the first rim headrace 13 and the second rim headrace 14 before the flush water overflows into the concave portion 9. Therefore, as the water level of the flush water of the toilet bowl 7 raises, even if the central lower portion 9a of the concave portion 9 is immersed in the water, before the step portions 9b and the base plate 3 installed at an upper parts of the step portions 9b are immersed in the flush water, the flush water is pooled in the first rim headrace 13, and the water level detection sensor 20 is arranged such that the pooled water level is detected. That is, the central lower portion 9a of the concave portion 9 is positioned lower than the water level detection sensor 20, while the step portions 9b, the base plate 3 that is positioned higher than the step portions 9b and the functional portion 4 are positioned higher than the water level detection sensor 20.

As shown in FIG. 5, in the state where the water level detection sensor 20 is attached to the base plate 3, the water level detection sensor 20 is positioned higher than the first spouting pipe 16 in the first rim headrace 13. In the normal state, when the flush water is discharged from the first spouting pipe 16 and the second spouting pipe 17 to the rim water passage 8 and cleans the inside of the toilet bowl 7, the water level detection sensor 20 is not immersed in water.

When the trap pipeline or the like of the toilet bowl 7 clogged and the water level of the flush water raised, the flush water flows into and pooled in the first rim headrace 13 from the first water outlet 13a connected to the rim water passage 8. Thereafter, the water level of the flush water is detected by the water level detection sensor 20 that is hung into the first rim headrace 13, and the water supply to the toilet bowl 7 from the first spouting pipe 16 and the second spouting pipe 17 is stopped before the flush water overflows from the toilet bowl 7. Alternatively, the water level detection sensor 20 may be configured to inform the user that the toilet bowl 7 is clogged and that the flush water raised to reach the first rim headrace 13 by a sound, turning on a lamp, or the like.

The flush toilet 1 according to the present embodiment includes the configuration explained above. In the following section, a method for detecting a rise in the water level of the flush water in the toilet bowl 7 will be described.

To perform a flushing of the toilet bowl 7 during the use of the flush toilet 1, the flush water is discharged from the flush water distributor, via the first spouting pipe 16 inside of the first rim headrace 13 and the second spouting pipe 17 inside of the second rim headrace 14, to the first water outlet 13a and the second water outlet 14a. Because this flush water flows through the rim water passage 8 and descends as it spirals in the toilet bowl 7 and flows into the water pooling portion 11, the filth is efficiently discharged from the toilet bowl 7.

During the flushing, the flush water smoothly flows from the rim water passage 8 toward the water pooling portion 11 by the streaming flow from the first spouting pipe 16 and the second spouting pipe 17 without staying in the first rim headrace 13 and the second rim headrace 14. Therefore, in a normal state, the water level detection sensor 20 that is installed in the first rim headrace 13 would not be immersed in the water, causing no erroneous detection.

During a manual cleaning of the toilet main body 2 and the toilet bowl 7, because the inside of the first rim headrace 13 that stores the water level detection sensor 20 is covered with the side wall portions 13b, 13c and the step portions 9b of the concave portion 9, the hand of the user or the water for cleaning does not reach the water level detection sensor 20. As a result, this configuration prevents erroneous detections by the water level detection sensor 20 even during the manual cleaning.

If the trap pipeline or the like of the toilet bowl 7 is clogged while the flush toilet 1 is in use, the supplied flush water stays in the toilet bowl 7 and the water level rises. If the rise in water level of the flush water progressed and the flush water reached the vicinity of the upper portion of the toilet bowl 7, the rim water passage 8 of the rim 6 becomes immersed, the flush water flows backward from the first water outlet 13a and the second water outlet 14a into the first rim headrace 13 and the second rim headrace 14, and the flush water accumulates therein. When the flush water accumulates in the first rim headrace 13, the water level rises and the water level detection sensor 20 that is hung from the base plate 3 is immersed, the float 22 rises, and the switch is turned on. Accordingly, the rise in water level of the flush water is detected by the water level detection sensor 20, holding the flush water supply to the first spouting pipe 16 and the second spouting pipe 17.

When the rising flush water in the toilet bowl 7 flows into the first rim headrace 13 and the second rim headrace 14 and pooled therein, the central lower portion 9a of the concave portion 9 that faces the toilet bowl 7 is also immersed in the water. Electrical components of the functional portion 4 is installed on the upper surface of the base plate 3, which is above the step portion 9b, which in turn is at a position higher than the central lower portion 9a of the concave portion 9. Therefore, the electrical components are positioned higher than the water level detection sensor 20 in the first rim headrace 13. As the result, before the water level reaches the electrical components, the water level is detected by the water level detection sensor 20, and the flush water supply is stopped. Therefore, the base plate 3 positioned higher than the water level detection sensor 20 or the electrical components of the functional portion 4 is not immersed in the water.

If the water level detection sensor 20 breaks down, the water level detection sensor 20 can either be repaired or replaced by removing the base plate 3 or the upper surface 2a.

According to the flush toilet 1 of the above present embodiment, the water level detection sensor 20 is installed in the first rim headrace 13 inside of the rim 6 at a portion covered with the central lower portion 9a of the concave portion 9. As a result, the water level detection sensor 20 is not immerged in the flush water that discharges in a normal flushing of the toilet. Furthermore, during a manual cleaning of the toilet main body 2, because the hand of the user or the water for cleaning does not reach the water level detection sensor 20, this configuration can prevent the water level detection sensor 20 from making erroneous detections.

According to the flush toilet 1 of the present embodiment, because the water level detection sensor 20 is supported by the base plate 3 and is hung into the first rim headrace 13 through the hole portion 2b of the step portion 9b, the water level detection sensor 20 is not visible from the outside and therefore at the lower side of the base plate 3, even if the water level detection sensor 20 is immersed in the overflown flush water or the filthy water, the configuration prevents the flush water and the filthy water from entering in the functional portion 4 provided on the base palate 3 and the electrical components from being immersed.

Generally, the toilet main body 2 including the toilet bowl 7 is made of ceramic. Therefore, it takes a substantial labor and cost in order to install a water level detection sensor 20 thereon. However, because the base plate 3 of the flush toilet 1 according to the present embodiment is formed by resin member or the like, an installation of the water level detection sensor 20 is easy and consume a low cost.

The flush toilet 1 according to the present invention is not limited to the embodiments described above. Appropriate modifications and substitutions or the like can be made without departing from the concept of the invention. In a respective modified example to be described below, the same constituent elements as those of the above-described embodiment will be designated by the same reference numerals, and a duplicate description will be omitted.

In the above embodiment, the water level detection sensor 20 is projected upward through the hole portion 2b formed in the step portion 9b of the concave portion 9 in the toilet main body 2 and the fixing plate 24 is fixed to the base plate 3. Alternatively, the fixing plate 24 may be fixed to the upper surface 2a of the toilet main body 2 or to the step portion 9b by a bolt and a nut, or the like.

A positon at which the water level detection sensor 20 in the first rim headrace 13 is installed may be, instead of above the first spouting pipe 16, in parallel with the first spouting pipe 16 or below the first spouting pipe 16. With this configuration, the flush water discharged from the first spouting pipe 16 does not stay in the first rim headrace 13 and flows to the outside of the rim water passage 8.

Figure 6:
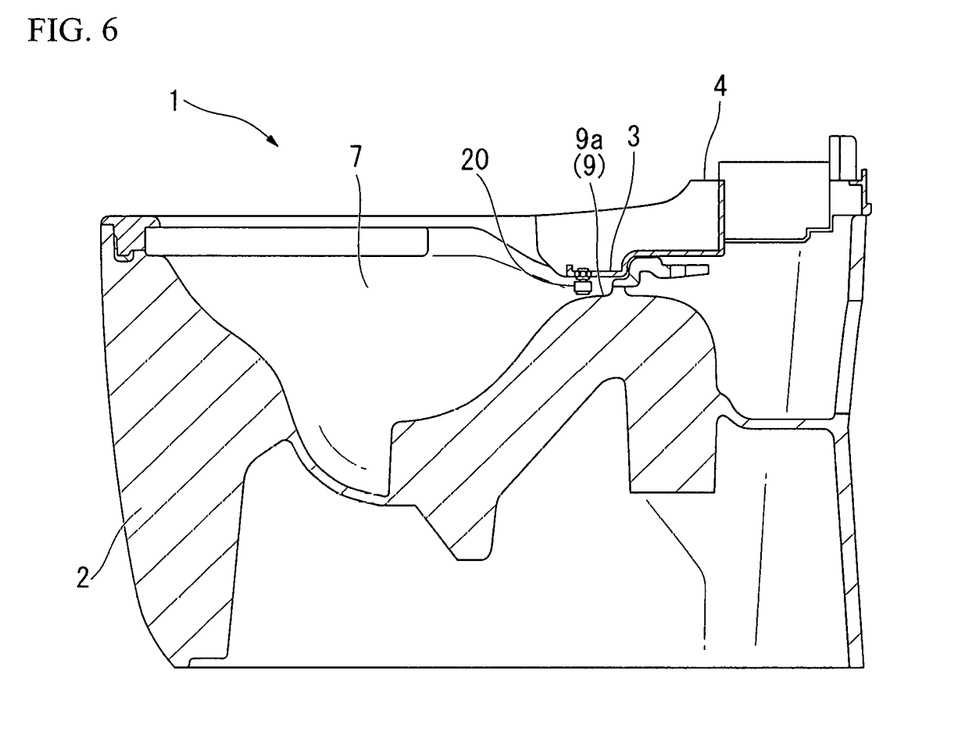
FIG. 6 is a cross-sectional view along line C-C in FIG. 1 showing a main portion of a modified example of the flush toilet according to the embodiment.

The water level detection sensor 20, as shown in FIG. 6, may be arranged so as to hang from the front end portion of the base plate 3 in an area of the central lower portion 9a of the concave portion 9 that is positioned in front of the first water outlet 13a instead of the first rim headrace 13.

Figure 8:
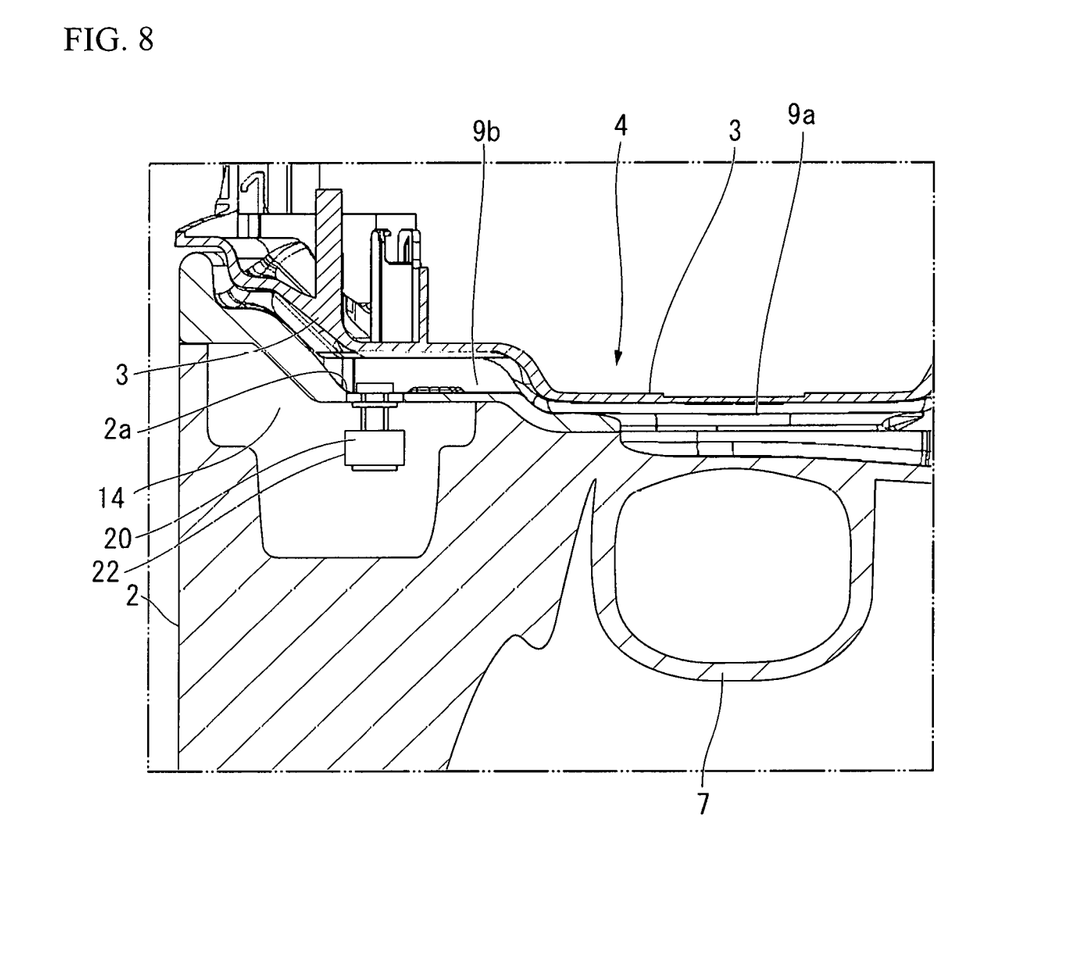
FIG. 8 is a cross-sectional view of a main portion showing the water level detection sensor that is arranged in the second rim headrace as another modified example.

As shown in FIG. 8, the water level detection sensor 20 may be installed in the second rim headrace 14 instead of in the first rim headrace 13. In this case, the water level detection sensor 20 may be fixed to the base plate 3 through a hole portion in the step portion 9b of the toilet main body 2 that is positioned above the second rim water passage 14. Alternatively, the water level detection sensor 20 may be fixed to the step portion 9b of the toilet main body 2 that is made of ceramic.

An installation position of the water level detection sensor 20 is not limited to be at a position inside the first rim headrace 13 or the second rim headrace 14. The water level detection sensor 20 may be located at any appropriate positon in the rim 6 which is not affected by the flush water that flows at the time of normal toilet flushing.

For example, as shown by two-dot chain lines in FIG. 3, the water level detection sensor 20 may be installed to the back surface of the eaves portion 8c of the rim water passage 8. In this case, a water detection sensor or the like may be installed as the water level detection sensor 20 instead of the float sensor, at a positon that does not contact the flush water that flows in the e.

In the present invention, the base plate 3 is included in a base portion.

In the present invention, the rim 6 includes the rim water passage 8, the first rim headrace 13, the second rim headrace 14, and portions of the base plate 3 that covers the first rim headrace 13 and the second rim headrace 14.

The above disclosure provides a flush toilet in which the water level detection sensor is installed at a position further upstream than the rim water passage. This configuration can prevent the water level detection sensor from being immersed and from being affected by fluctuations of the pressure of the flush water at the time of normal toilet flushing.

REFERENCE SIGNS LIST

1 Flush toilet
2 Toilet main body
2a Upper surface
3 Base plate
4 Functional portion 6 Rim
7 Toilet bowl
8 Rim water passage
13 First rim headrace
14 Second rim headrace
20 Water level detection sensor
22 Float

What is claimed is:

1. A flush toilet comprising;
a toilet main body comprising a longitudinal axis extending down a center of the toilet main body from a rear of the toilet main body to a front of the toilet main body;
a rim which is provided on an upper portion of a toilet bowl of the toilet main body and along which a flush water flows into the toilet bowl; and
a detection part of a water level detection sensor, wherein the water level detection sensor is suspended within a cavity formed in the rim, wherein the cavity and the detection part are offset from the longitudinal axis, and the detection part is configured such that a lowermost position of the detection part is spaced apart from a lower wall of the cavity, at a position lower than an upper surface of a front and a side surrounding the toilet bowl, wherein the water level detection sensor is provided with a float which is attached to a lower portion of a supporting shaft extending vertically and is configured to move vertically, and the water level detection sensor is provided with a stopper fixed to the lower portion of the supporting shaft.

2. The flush toilet of claim 1, wherein the water level detection sensor is provided on a base portion which is positioned on an upper portion of the rim and at which a functional portion is installed, or is installed to a back surface of an eaves portion of the rim.

3. The flush toilet of claim 1, wherein
the rim has a rim water passage and a rim headrace that is provided upstream of the rim water passage,
the water level detection sensor is installed at the rim headrace.

4. The flush toilet of claim 2, wherein
the rim has a rim water passage and a rim headrace that is provided upstream of the rim water passage,
the water level detection sensor is installed at the rim headrace.

5. The flush toilet of claim 3, further comprising a spouting pipe in the rim, where the water detection sensor is positioned higher than the spouting pipe.

6. The flush toilet of claim 4, further comprising a spouting pipe in the rim, where the water detection sensor is positioned higher than the spouting pipe.

7. A flush toilet comprising;
a toilet main body;
a rim which is provided on an upper portion of a toilet bowl of the toilet main body and along which a flush water flows into the toilet bowl; and
a water level detection sensor provided inside a cavity formed in the rim, wherein the water level detection sensor is mounted on a base plate, at a position lower than an upper surface of a front and a side surrounding the toilet bowl, on an upper portion of the rim and at which a functional portion is installed;
wherein the base plate is mounted to an upper surface of a rear portion of the toilet bowl and is provided above an uppermost portion of the cavity formed in the rim, the water level detection sensor is provided with a float which is attached to a lower portion of a supporting shaft extending vertically and is configured to move vertically, and the water level detection sensor is provided with a stopper fixed to the lower portion of the supporting shaft.

8. The flush toilet of claim 1, comprising
a private part cleaning device located at the rear of the toilet main body, wherein the private part cleaning device is mounted on a base plate provided above an uppermost portion of the cavity formed in the rim.

9. The flush toilet of claim 7, comprising a private part cleaning device located at the rear of the toilet main body, wherein the private part cleaning device is mounted on the base plate.

10. A flush toilet comprising;
a toilet main body comprising a longitudinal axis extending down a center of the toilet main body from a rear of the toilet main body to a front of the toilet main body;
a rim which is provided on an upper portion of a toilet bowl of the toilet main body and along which a flush water flows into the toilet bowl; and
a detection part of a water level detection sensor, wherein the water level detection sensor is suspended within a cavity formed in the rim, wherein the cavity and the detection part are offset from the longitudinal axis, and the detection part is configured such that a lowermost position of the detection part is spaced apart from a lower wall of the cavity, at a position lower than an upper surface of a front and a side surrounding the toilet bowl, wherein
the water level detection sensor has a reed-switch-type float switch which is provided with a float having a magnet inside the float, and the reed-switch-type float switch is configured to turn on by detecting the magnet when a position of the float rises from a lower limit position to an upper limit position due to a rise of the water level.

11. A flush toilet comprising;
a toilet main body;
a rim which is provided on an upper portion of a toilet bowl of the toilet main body and along which a flush water flows into the toilet bowl; and
a water level detection sensor provided inside a cavity formed in the rim, wherein the water level detection sensor is mounted on a base plate, at a position lower than an upper surface of a front and a side surrounding the toilet bowl, on an upper portion of the rim and at which a functional portion is installed;
wherein the base plate is mounted to an upper surface of a rear portion of the toilet bowl and is provided above an uppermost portion of the cavity formed in the rim, wherein
the water level detection sensor has a reed-switch-type float switch which is provided with a float having a magnet inside the float, and the reed-switch-type float switch is configured to turn on by detecting the magnet when a position of the float rises from a lower limit position to an upper limit position due to a rise of the water level.

* * * * *